(12) United States Patent
Lai et al.

(10) Patent No.: US 8,643,351 B2
(45) Date of Patent: Feb. 4, 2014

(54) SWITCHING MODE POWER SUPPLY AND THE METHOD THEREOF

(75) Inventors: Pengjie Lai, San Jose, CA (US); Jian Jiang, Los Gatos, CA (US); Eric Yang, Saratoga, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 105 days.

(21) Appl. No.: 13/339,030

(22) Filed: Dec. 28, 2011

(65) Prior Publication Data

US 2013/0169258 A1    Jul. 4, 2013

(51) Int. Cl.
*G05F 1/44*    (2006.01)

(52) U.S. Cl.
USPC ........................................ 323/282

(58) Field of Classification Search
USPC .......... 323/222, 224, 225, 282, 283, 285, 351
See application file for complete search history.

(56) References Cited

U.S. PATENT DOCUMENTS

| | | | | |
|---|---|---|---|---|
| 5,552,695 | A * | 9/1996 | Schwartz | 323/271 |
| 5,617,015 | A * | 4/1997 | Goder et al. | 323/282 |
| 5,847,554 | A * | 12/1998 | Wilcox et al. | 323/282 |
| 5,912,552 | A * | 6/1999 | Tateishi | 323/285 |
| 6,580,258 | B2 * | 6/2003 | Wilcox et al. | 323/282 |
| 6,995,483 | B2 * | 2/2006 | Kohout et al. | 307/151 |
| 8,102,162 | B2 * | 1/2012 | Moussaoui et al. | 323/266 |
| 2012/0001610 | A1 * | 1/2012 | Klein | 323/284 |
| 2012/0319604 | A1 * | 12/2012 | Walters | 315/200 R |
| 2013/0015827 | A1 * | 1/2013 | Shi | 323/266 |
| 2013/0134985 | A1 * | 5/2013 | Bernardon | 324/527 |

FOREIGN PATENT DOCUMENTS

WO    PCT/US09/48001    6/2009

OTHER PUBLICATIONS

U.S. Appl. No. 11/455,022, filed Jun. 15, 2006, Monolithic Power Systems.
U.S. Appl. No. 10/685,132, filed Oct. 14, 2003, Monolithic Power Systems.
U.S. Appl. No. 12/140,410, filed Jun. 17, 2008, Monolithic Power Systems.
U.S. Appl. No. 12/908,748, filed Oct. 20, 2010, Monolithic Power Systems.
U.S. Appl. No. 12/057,747, filed Mar. 28, 2008, Monolithic Power Systems.
U.S. Appl. No. 13/051,360, filed Mar. 18, 2011, Monolithic Power Systems.
U.S. Appl. No. 12/057,717, filed Mar. 28, 2008, Monolithic Power Systems.

* cited by examiner

*Primary Examiner* — Adolf Berhane
(74) *Attorney, Agent, or Firm* — Perkins Coie LLP

(57) ABSTRACT

The present disclosure discloses a switching mode power supply with bi-direction buck and boost control. The switching mode power supply enters boost mode when an input signal is higher than a preset threshold to pump the input signal to a higher level; and the switching mode power supply enters buck mode when the input signal breaks down to release the stored energy.

20 Claims, 3 Drawing Sheets

SWITCHING MODE POWER SUPPLY AND THE METHOD THEREOF

TECHNICAL FIELD

The present disclosure relates generally to electrical circuits, and more particularly but not exclusively to switching mode power supplies.

BACKGROUND

In typical DSL or ADSL applications, extended to the solid state drive or hard disk drive application, a plurality of storage capacitors coupled in parallel are commonly used to store energy to support sudden power shutdown, which highly increases the system cost.

Storing the energy in a high voltage form and releasing the energy when the power fails can reduce the amount of storage capacitors. Prior art using the combination of a charge pump and a LDO (low dropout) circuit to achieve the energy management, where the charge pump is used to pump the input signal to a higher voltage and the LDO circuit is used to release the stored energy. However, the charge pump needs many switches, which make the system complicated. But to achieve higher storage voltage, more switches are needed. In addition, the LDO circuit has large power loss during the releasing which dramatically reduces the system efficiency and increases again the system burden.

SUMMARY

It is an object of the present disclosure to provide a switching mode power supply that resolves the above problems.

In accomplishing the above and other objects, there has been provided, in accordance with an embodiment of the present disclosure, a switching mode power supply, comprising: an input port configured to receive an input signal; a storage port configured to provide a storage voltage; an inductor having a first terminal and a second terminal, wherein the first terminal is coupled to the input port to receive the input signal; a power stage coupled between the second terminal of the inductor and the storage port; a storage capacitor coupled between the storage port and ground to store energy; a boost controller configured to receive a feed forward signal indicative of the input signal, and generates a boost control signal to control the power stage to operate in boost mode when the input signal is higher than a boost threshold; and a buck controller configured to receive the feed forward signal indicative of the input signal, and generates a buck control signal to control the power stage to operate in buck mode, when the input signal is lower than a buck threshold and when the storage voltage is higher than the input signal; wherein the buck threshold is lower than the boost threshold.

In addition, there has been provided, in accordance with an embodiment of the present disclosure, a method used for a switching mode power supply, comprising: comparing an input signal with a UVLO threshold: start to operate the switching mode power supply until the input signal is higher than the UVLO threshold; comparing the input signal with a boost threshold: if the input signal is higher than the boost threshold, controlling the switching mode power supply enter boost mode to pump the input signal into a higher level to get a storage voltage; and if not, go to next step; comparing the input signal with a buck threshold and the storage voltage: if the input signal is lower than both the buck threshold and the storage voltage, controlling the switching mode power supply enter buck mode to release the stored voltage; and if not, go to next step; and comparing the input signal again with the UVLO threshold: if the input signal is lower than the UVLO threshold, stopping the operation of the switching mode power supply; and if not, back to the step of comparing the input signal with the buck threshold and the storage voltage.

Furthermore, there has been provided, in accordance with an embodiment of the present disclosure, a switching mode power supply, comprising: an input port configured to receive an input signal; a storage port configured to provide a storage voltage; an inductor having a first terminal and a second terminal, wherein the first terminal is coupled to the input port to receive the input signal; an upper switch having a first terminal and a second terminal, wherein the first terminal is coupled to the second terminal of the inductor, the second terminal is coupled to the storage port; a lower switch having a first terminal and a second terminal, wherein the first terminal is coupled to the second terminal of the inductor, the second terminal is coupled to a reference ground; a storage capacitor coupled between the storage port and ground to store energy; a boost controller configured to receive a feed forward signal indicative of the input signal, and generates a boost control signal to control the upper switch and the lower switch to cause the switching mode power supply operate in boost mode when the input signal is higher than a boost threshold; and a buck controller configured to receive the feed forward signal indicative of the input signal, and generates a buck control signal to control the upper switch and the lower switch to cause the switching mode power supply operate in buck mode, when the input signal is lower than a buck threshold and when the storage voltage is higher than the input signal; wherein the buck threshold is lower than the boost threshold.

The use of the same reference label in different drawings indicates the same of like components.

DETAILED DESCRIPTION

In the present disclosure, numerous specific details are provided, such as examples of circuits, components, and methods, to provide a thorough understanding of embodiments of the disclosure. Persons of ordinary skill in the art will recognize, however, that the disclosure can be practiced without one or more of the specific details. In other instances, well-known details are not shown or described to avoid obscuring aspects of the disclosure.

Figure 1:
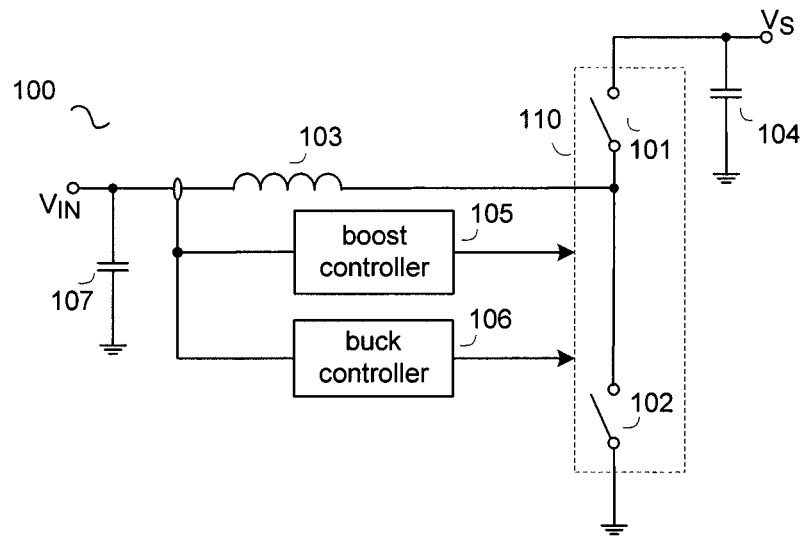
FIG. 1 schematically shows a switching mode power supply 100 in accordance with an embodiment of the present disclosure.

FIG. 1 schematically shows a switching mode power supply 100 in accordance with an embodiment of the present disclosure. In the example of FIG. 1, the switching mode power supply 100 comprises: an input port configured to receive an input signal $V_{IN}$; a storage port configured to provide a storage voltage $V_S$; an inductor 103 having a first terminal and a second terminal, wherein the first terminal is coupled to the input port to receive the input signal $V_{IN}$; a power stage 110 coupled between the second terminal of the inductor 103 and the storage port; a storage capacitor 104 coupled between the storage port and ground to store energy; a boost controller 105 configured to receive a feed forward signal indicative of the input signal $V_{IN}$, and generates a boost control signal to control the power stage 110 to operate in boost mode when the input signal is higher than a boost threshold; and a buck controller 106 configured to receive the feed forward signal indicative of the input signal $V_{IN}$, and generates a buck control signal to control the power stage 110 to operate in buck mode when the input signal is lower than a buck threshold and when the storage voltage $V_S$ is higher than the input signal $V_{IN}$; wherein the buck threshold is lower than the boost threshold.

In one embodiment, the switching mode power supply 100 further comprises a UVLO (under voltage lock out) block (not shown) configured to compare the input signal with a UVLO reference. If the input signal is higher than the UVLO threshold, the switching mode power 100 starts to operate; and if the input signal is lower than the UVLO threshold, the operation of the switching mode power supply 100 ends.

In one embodiment, the switching mode power supply 100 further comprises an input capacitor 107 coupled between the input port and a reference ground to smooth the input signal $V_{IN}$.

In one embodiment, the power stage 110 comprises an upper switch 101 and a lower switch 102 coupled in series between the storage port and the reference ground, and the conjunction of the upper switch 101 and the lower switch 102 is coupled to the second terminal of the inductor 103.

In one embodiment, the upper switch 101 and the lower switch 102 comprise a MOSFET, respectively. One skilled in relevant art will recognize, however, the upper switch 101 and the lower switch 102 may comprise other kinds of semiconductor devices, such as IGBT, BJT, etc. . . .

When the input signal $V_{IN}$ is higher the UVLO threshold, the switching mode power supply 100 is in operation. If the voltage level of the input signal is higher than the boost threshold, the buck controller 106 is blocked, and the boost controller 105 is activated to provide the boost control signal to the power stage 110 to control the power stage to operate in boost mode, so that the input signal is pumped to a desired high voltage at the storage port. If the voltage level of the input signal is lower than the buck threshold and the storage voltage $V_S$ is higher than the input signal $V_{IN}$, the boost controller 105 is blocked, and the buck controller 106 is activated to provide the buck control signal to the power stage 110 to control the power stage to operate in buck mode, so that the energy stored at the storage capacitor 104 is released via the power stage 110 and the inductor 103. If the voltage level of the input signal is lower than the boost threshold and higher than the buck threshold, the power stage 110 operates as its previous state.

Figure 2:
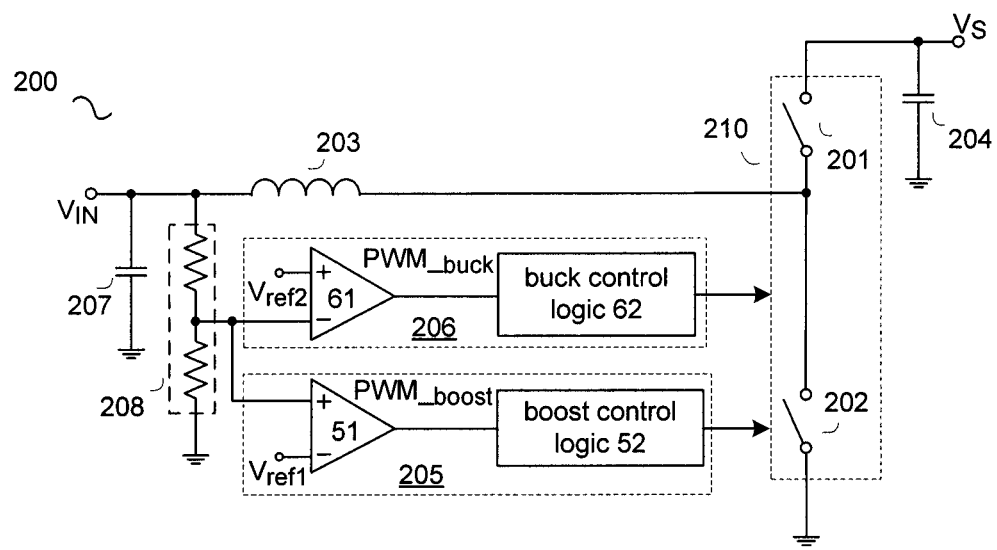
FIG. 2 schematically shows a switching mode power supply 200 with a buck controller 205 and a boost controller 206 in accordance with an embodiment of the present disclosure.

FIG. 2 schematically shows a switching mode power supply 200 with a boost controller 205 and a buck controller 206 in accordance with an embodiment of the present disclosure. In the example of FIG. 2, the boost controller 205 comprises: a first comparator 51 having a first input terminal, a second input terminal and an output terminal, wherein the first input terminal is configured to receive the feed forward signal indicative of the input signal $V_{IN}$, the second input terminal is configured to receive a first threshold $V_{ref1}$, and wherein based on the feed forward signal and the first threshold $V_{ref1}$, the first comparator 51 generates the boost status signal $PWM_{\_boost}$ at the output terminal; and a boost control logic unit 52 coupled to the output terminal of the first comparator 51 to receive the boost status signal $PWM_{\_boost}$, wherein based on the boost status signal $PWM_{\_boost}$, the boost control logic unit 52 generates the boost control signal. The buck controller 206 comprises: a second comparator 61 having a first input terminal, a second input terminal and an output terminal, wherein the first input terminal is configured to receive the feed forward signal indicative of the input signal $V_{IN}$, the second input terminal is configured to receive a second threshold $V_{ref2}$, and wherein based on the feed forward signal and the first threshold $V_{ref1}$, the second comparator 61 generates the buck status signal $PWM_{\_buck}$ at the output terminal; and a buck control logic unit 62 coupled to the output terminal of the second comparator 61 to receive the buck status signal $PWM_{\_buck}$, wherein based on the buck status signal $PWM_{\_buck}$, the buck control logic unit 62 generates the buck control signal.

In one embodiment, the first threshold $V_{ref1}$ is higher than the second threshold $V_{ref2}$, wherein the first threshold is related to the boost threshold, and the second threshold is related to the buck threshold.

In one embodiment, the switching mode power supply 200 further comprises a feed forward circuit 208 coupled to the input port to receive the input signal, and to generate the feed forward signal based thereupon. In one embodiment, the feed forward circuit 208 comprises a first resistor and a second resistor coupled in series between the input port and the reference ground, wherein the feed forward signal is provided at the conjunction of the first resistor and the second resistor.

Figure 3:
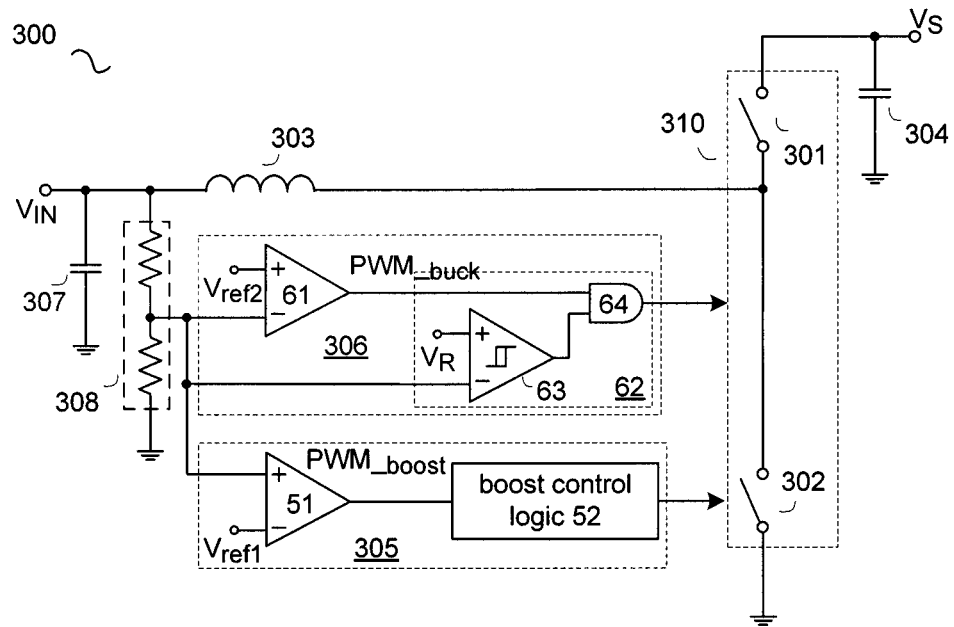
FIG. 3 schematically shows a switching mode power supply 300 with a buck controller 305 in accordance with an embodiment of the present disclosure.

FIG. 3 schematically shows a switching mode power supply 300 with a buck controller 306 in accordance with an embodiment of the present disclosure. In the example of FIG. 3, the buck controller 306 comprises: a second comparator 61 having a first input terminal, a second input terminal and an output terminal, wherein the first input terminal is configured to receive the feed forward signal indicative of the input signal $V_{IN}$, the second input terminal is configured to receive the second threshold $V_{ref2}$, and wherein based on the feed forward signal and the second threshold $V_{ref2}$, the second comparator 61 generates the buck status signal $PWM_{\_buck}$ at the output terminal; a hysteretic comparator 63 having a first input terminal, a second input terminal and an output terminal, wherein the first input terminal is configured to receive the feed forward signal indicative of the input signal $V_{IN}$, the second input terminal is configured to receive a reference voltage $V_R$, and wherein based on the feed forward signal, the reference voltage $V_R$, and an inherent hysteresis of the hysteretic comparator 63, the hysteretic comparator 63 generates a switching signal at the output terminal; and a logic circuit 64 having a first input terminal, a second input terminal, and an output terminal, wherein the first input terminal is coupled to the output terminal of the second comparator 61 to receive the buck status signal $PWM_{\_buck}$, the second input terminal is coupled to the output terminal of the hysteretic comparator 63 to receive the switching signal, and wherein based on the buck status signal $PWM_{\_buck}$ and the switching signal, the logic circuit 64 generates the buck control signal at the output terminal.

In one embodiment, the logic circuit 64 comprises an AND gate.

When the input signal $V_{IN}$ is higher the UVLO threshold, the switching mode power supply 300 is in operation. If the feed forward signal is higher than the first threshold $V_{ref1}$, which indicates that the input signal is higher than the boost threshold, the buck controller 306 is blocked, and the boost controller 305 is activated, so that the power stage operates in boost mode as discussed hereinbefore. But if the feed forward signal becomes lower than the second threshold $V_{ref2}$, which indicates that the input signal becomes lower than the buck threshold, and the storage voltage $V_s$ is higher than the input signal $V_{IN}$, the boost controller 305 is blocked, and the buck controller 306 is activated, so the power stage 310 operates in buck mode. Specifically speaking, when the power stage 310 operates in buck mode, in one hand, the second comparator 61 provides a logical high buck status signal $PWM\_buck$ to the AND gate. In the other hand, the feed forward signal is compared with an upper limit and a lower limit of the hysteretic comparator 63, wherein the upper limit and the lower limit are formed by the reference voltage $V_R$ and the inherent hysteresis of the hysteretic comparator 63. If the feed forward signal is lower than the lower limit, the switching signal generated by the hysteretic comparator 63 is logical high. So the buck control signal $PWM\_buck$ generated by the logic unit 64 is logical high. Accordingly, the upper switch 301 is turned on, and the lower switch 302 is turned off, to extend the on time of the upper switch 301 and shorten the on time of the lower switch 302. As a result, the input signal $V_{IN}$ increases. If the input signal $V_{IN}$ increases to be higher than the upper limit, the switching signal generated by the hysteretic comparator 63 is logical low. So the buck control signal $PWM\_buck$ generated by the logic unit 64 is logical low. Accordingly, the upper switch 301 is turned off, and the lower switch 302 is turned on, to extend the on time of the lower switch 302 and shorten the on time of the upper switch 301. As a result, the input signal $V_{IN}$ decreases. If the input signal $V_{IN}$ decreases to be lower than the lower limit, the buck controller 306 again turns on the upper switch 301 and turns off the lower switch 302, and the operation of the switching mode power supply 300 repeats. By such regulation, the hysteretic comparator 63 ensures the input signal $V_{IN}$ to follow the reference voltage $V_R$ during buck mode.

Figure 4:
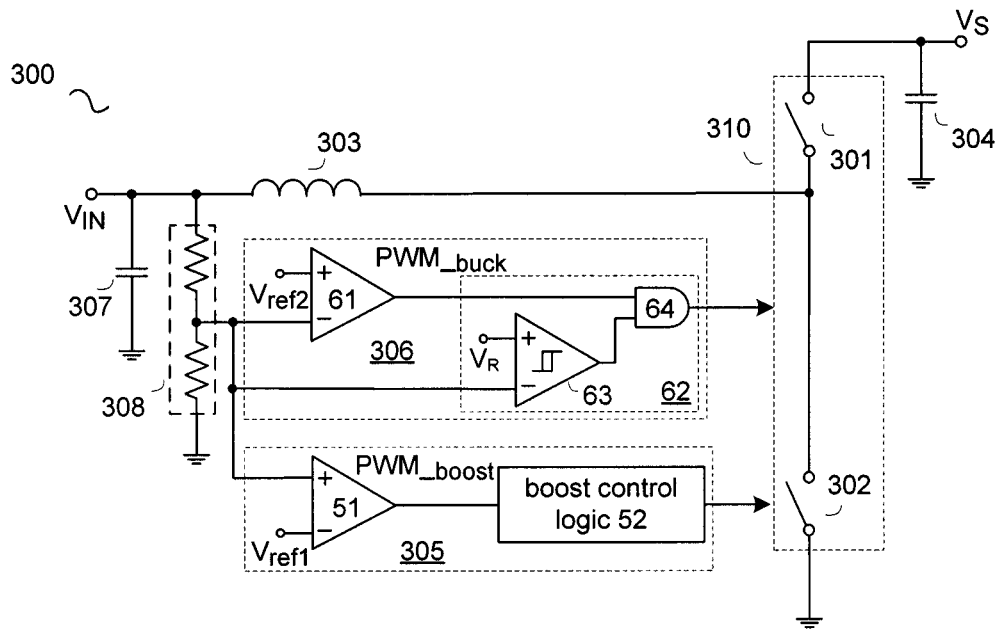
FIG. 4 schematically shows a switching mode power supply 400 with a buck controller 405 in accordance with an embodiment of the present disclosure.

FIG. 4 schematically shows a switching mode power supply 400 with a buck controller 406 in accordance with an embodiment of the present disclosure. In the example of FIG. 4, the buck controller 406 comprises: a second comparator 61 having a first input terminal, a second input terminal and an output terminal, wherein the first input terminal is configured to receive the feed forward signal indicative of the input signal $V_{IN}$, the second input terminal is configured to receive the second threshold $V_{ref2}$, and wherein based on the feed forward signal and the second threshold $V_{ref2}$, the second comparator 61 generates the buck status signal $PWM\_buck$ at the output terminal; a constant on time unit 65 configured to receive the feed forward signal indicative of the input signal, wherein based on the feed forward signal, the constant on time unit 65 generates a switching control signal; and a logic circuit 64 having a first input terminal, a second input terminal, and an output terminal, wherein the first input terminal is coupled to the output terminal of the second comparator 61 to receive the buck status signal $PWM\_buck$, the second input terminal is coupled to the constant on time unit 65 to receive the switching signal, and wherein based on the buck status signal $PWM\_buck$ and the switching signal, the logic circuit 64 generates the buck control signal at the output terminal.

In one embodiment, the logic circuit 54 comprises an AND gate.

When the input signal $V_{IN}$ is higher than the UVLO threshold, the switching mode power supply 400 is in operation. When the switching mode power supply 400 operates in buck mode, the switching signal provided by the constant on time unit 65 has a constant on time and a variable off time in each switching cycle time, so as to regulate the input signal at desired voltage level.

Several embodiments of the foregoing switching mode power supply provide energy management by bi-directional buck boost conversion with only one power stage (e.g. composed by two switches coupled in series) compared to conventional technique discussed above. Unlike the conventional technique, several embodiments of the foregoing switching mode power supply provide any desired storage voltage by regulating the power stage without adopting more switches. Furthermore, several embodiments of the foregoing switching mode power supply control the switches in the power stage to operate at switching state, which reduces power loss and increases the system efficiency.

Figure 5:
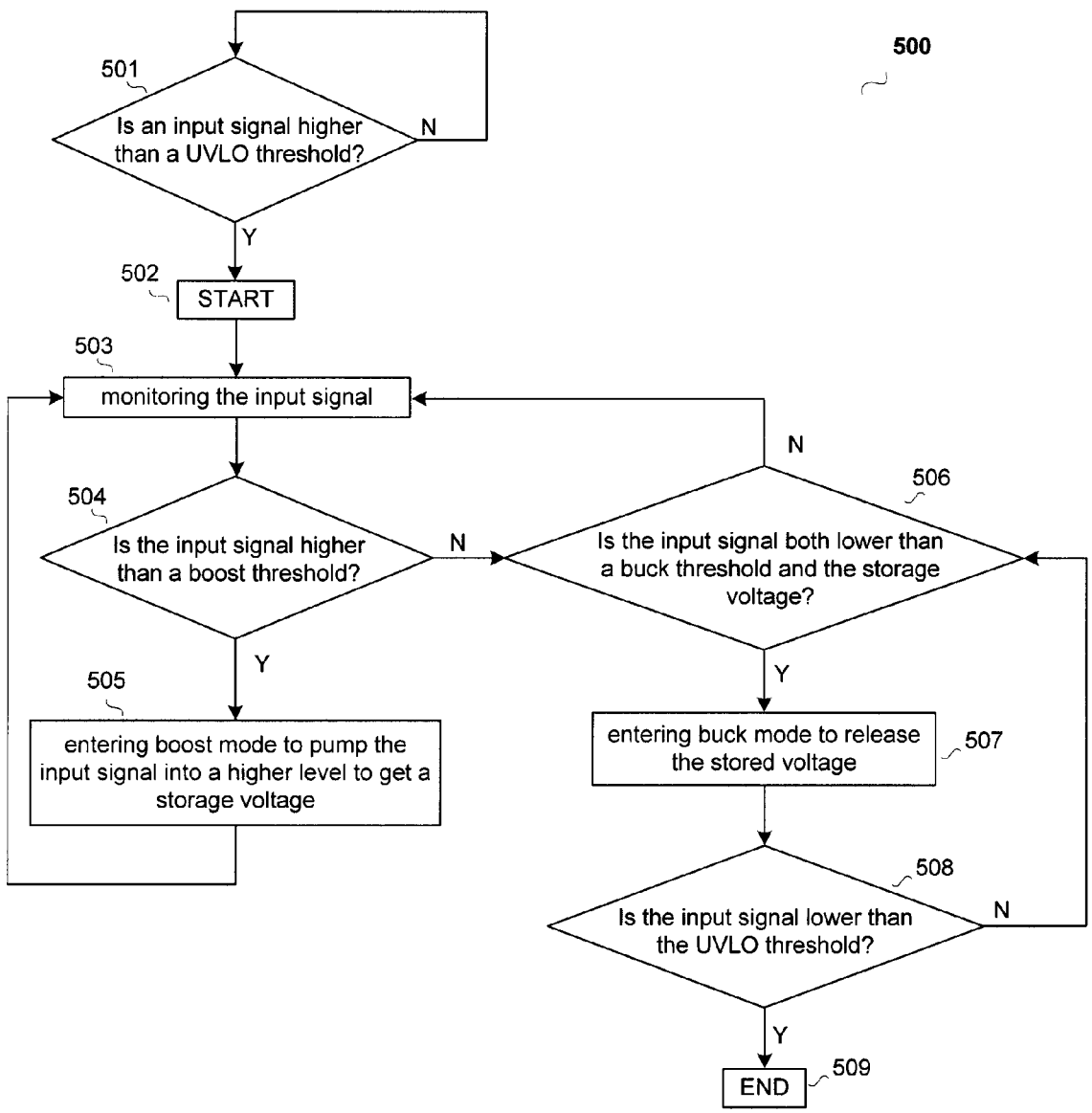
FIG. 5 schematic shows a flowchart 500 of a method for a switching mode power supply in accordance with an embodiment of the present disclosure.

FIG. 5 schematic shows a flowchart 500 of a method for a switching mode power supply in accordance with an embodiment of the present disclosure. The method comprises: step 501, comparing an input signal with a UVLO threshold: if the input signal is higher than the UVLO threshold, go to step 502; and if not, continue comparing the input signal with the UVLO threshold; step 502, start; step 503, monitoring the input signal; step 504, comparing the input signal with a boost threshold: if the input signal is higher than the boost threshold, go to step 505; and if not, go to step 506; step 505, entering boost mode to pump the input signal into a higher level to get a storage voltage; step 506, comparing the input signal with a buck threshold and the storage voltage: if the input signal is both lower than the buck threshold and the storage voltage, go to step 507; and if not, back to step 503; step 507, entering buck mode to release the storage voltage; step 508, comparing the input signal again with the UVLO threshold, if the input signal is lower than UVLO threshold, go to step 509; if not, back to step 506; and step 509, end; wherein the buck threshold is lower than the boost threshold.

In one embodiment, the method further comprises adopting hysteretic control in buck mode.

In one embodiment, the method further comprises adopting constant on time control in buck mode.

In one embodiment, the method further comprises maintaining the switching mode power supply in the previous mode, if the input signal is higher than the buck threshold and is lower than the boost threshold.

While specific embodiments of the present disclosure have been provided, it is to be understood that these embodiments are for illustration purposes and not limiting. Many additional embodiments will be apparent to persons of ordinary skill in the art reading this disclosure.

We claim:

1. A switching mode power supply, comprising:
   an input port configured to receive an input signal;
   a storage port configured to provide a storage voltage;
   an inductor having a first terminal and a second terminal, wherein the first terminal is coupled to the input port to receive the input signal;
   a power stage coupled between the second terminal of the inductor and the storage port;
   a storage capacitor coupled between the storage port and ground to store energy;
   a boost controller configured to receive a feed forward signal indicative of the input signal, and to generate a boost control signal to control the power stage to operate in boost mode when the input signal is higher than a boost threshold; and
   a buck controller configured to receive the feed forward signal indicative of the input signal, and to generate a buck control signal to control the power stage to operate in buck mode, when the input signal is lower than a buck threshold and when the storage voltage is higher than the input signal; wherein the buck threshold is lower than the boost threshold.

2. The switching mode power supply of claim 1, further comprising a feed forward circuit coupled to the input port to receive the input signal, and to generate the feed forward signal based thereupon.

3. The switching mode power supply of claim 1, further comprising an input capacitor coupled between the input port and a reference ground to smooth the input signal.

4. The switching mode power supply of claim 1, further comprising an under voltage lock out block configured to compare the input signal with the input signal; wherein if the input signal is higher than an under voltage lock out threshold, the switching mode power starts to operate; and if the input signal is lower than the under voltage lock out threshold, the operation of the switching mode power supply ends.

5. The switching mode power supply of claim 1, wherein the power stage comprises an upper switch and a lower switch coupled in series between the storage port and ground, and wherein the conjunction of the upper switch and the lower switch is coupled to the second terminal of the inductor.

6. The switching mode power supply of claim 1, wherein boost controller comprises:

a first comparator having a first input terminal, a second input terminal and an output terminal, wherein the first input terminal is configured to receive the feed forward signal indicative of the input signal, the second input terminal is configured to receive a first threshold, and wherein based on the feed forward signal and the first threshold, the first comparator generates the boost status signal at the output terminal; and a boost control logic unit coupled to the output terminal of the first comparator to receive the boost status signal, wherein based on the boost status signal, the boost control logic unit generates the boost control signal.

7. The switching mode power supply of claim 6, wherein the first threshold is related to the boost threshold.

8. The switching mode power supply of claim 1, wherein the buck controller comprises:

a comparator having a first input terminal, a second input terminal and an output terminal, wherein the first input terminal is configured to receive the feed forward signal indicative of the input signal, the second input terminal is configured to receive a threshold, and wherein based on the feed forward signal and the threshold, the comparator generates the buck status signal at the output terminal; and a buck control logic unit coupled to the output terminal of the comparator to receive the buck status signal, wherein based on the buck status signal, the buck control logic unit generates the buck control signal.

9. The switching mode power supply of claim 8, wherein the threshold is related to the buck threshold.

10. The switching mode power supply of claim 1, wherein the buck controller comprises:

a comparator having a first input terminal, a second input terminal and an output terminal, wherein the first input terminal is configured to receive the feed forward signal indicative of the input signal, the second input terminal is configured to receive a threshold, and wherein based on the feed forward signal and the threshold, the comparator generates the buck status signal at the output terminal; and wherein the threshold is related to the buck threshold;

a hysteretic comparator having a first input terminal, a second input terminal and an output terminal, wherein the first input terminal is configured to receive the feed forward signal indicative of the input signal, the second input terminal is configured to receive a reference voltage, and wherein based on the feed forward signal, the reference voltage and an inherent hysteresis of the hysteretic comparator, the hysteretic comparator generates a switching signal at the output terminal; and a logic circuit having a first input terminal, a second input terminal, and an output terminal, wherein the first input terminal is coupled to the output terminal of the comparator to receive the buck status signal, the second input terminal is coupled to the output terminal of the hysteretic comparator to receive the switching signal, and wherein based on the buck status signal and the switching signal, the logic circuit generates the buck control signal at the output terminal.

11. The switching mode power supply of claim 10, wherein the logic circuit comprises an AND gate.

12. The switching mode power supply of claim 1, wherein the buck controller comprises:

a comparator having a first input terminal, a second input terminal and an output terminal, wherein the first input terminal is configured to receive the feed forward signal indicative of the input signal, the second input terminal is configured to receive a threshold, and wherein based on the feed forward signal and the threshold, the comparator generates the buck status signal at the output terminal; and wherein the threshold is related to the buck threshold;

a constant on time unit configured to receive the feed forward signal indicative of the input signal, wherein based on the feed forward signal, the constant on time unit generates a switching control signal; and a logic circuit having a first input terminal, a second input terminal, and an output terminal, wherein the first input terminal is coupled to the output terminal of the comparator to receive the buck status signal, the second input terminal is coupled to the constant on time unit to receive the switching signal, and wherein based on the buck status signal and the switching signal, the logic circuit generates the buck control signal at the output terminal.

13. A method used for a switching mode power supply, comprising:

comparing an input signal with an under voltage lock out threshold:

start to operate the switching mode power supply until the input signal is higher than the under voltage lock out threshold;

comparing the input signal with a boost threshold: if the input signal is higher than the boost threshold, controlling the switching mode power supply enter boost mode to pump the input signal into a higher level to get a storage voltage; and if not, go to next step;

comparing the input signal with a buck threshold and the storage voltage: if the input signal is lower than both the buck threshold and the storage voltage, controlling the switching mode power supply enter buck mode to release the stored voltage; and if not, go to next step; and comparing the input signal again with the under voltage lock out threshold: if the input signal is lower than the under voltage lock out threshold, stopping the operation of the switching mode power supply; and if not, back to the step of comparing the input signal with the buck threshold and the storage voltage.

14. The method of claim 13, further comprising adopting hysteretic control when the switching mode power supply enters buck mode.

15. The method of claim 13, further comprising adopting constant on time control when the switching mode power supply enters buck mode.

16. The method of claim 13, further comprising maintaining the switching mode power supply in the previous mode, if the input signal is higher than the buck threshold and is lower than the boost threshold.

17. A switching mode power supply, comprising:
an input port configured to receive an input signal;
a storage port configured to provide a storage voltage;
an inductor having a first terminal and a second terminal, wherein the first terminal is coupled to the input port to receive the input signal;
an upper switch having a first terminal and a second terminal, wherein the first terminal is coupled to the second terminal of the inductor, the second terminal is coupled to the storage port;
a lower switch having a first terminal and a second terminal, wherein the first terminal is coupled to the second terminal of the inductor, the second terminal is coupled to a reference ground;
a storage capacitor coupled between the storage port and ground to store energy;
a boost controller configured to receive a feed forward signal indicative of the input signal, and to generate a boost control signal to control the upper switch and the lower switch to cause the switching mode power supply operate in boost mode when the input signal is higher than a boost threshold; and
a buck controller configured to receive the feed forward signal indicative of the input signal, and to generate a buck control signal to control the upper switch and the lower switch to cause the switching mode power supply operate in buck mode, when the input signal is lower than a buck threshold and when the storage voltage is higher than the input signal; wherein
the buck threshold is lower than the boost threshold.

18. The switching mode power supply of claim 17, wherein the boost controller comprises:
a first comparator having a first input terminal, a second input terminal and an output terminal, wherein the first input terminal is configured to receive the feed forward signal indicative of the input signal, the second input terminal is configured to receive a first threshold, and wherein based on the feed forward signal and the first threshold, the first comparator generates the boost status signal at the output terminal; and
a boost control logic unit coupled to the output terminal of the first comparator to receive the boost status signal, wherein based on the boost status signal, the boost control logic unit generates the boost control signal; wherein the first threshold is related to the boost threshold.

19. The switching mode power supply of claim 17, wherein the buck controller comprises:
a comparator having a first input terminal, a second input terminal and an output terminal, wherein the first input terminal is configured to receive the feed forward signal indicative of the input signal, the second input terminal is configured to receive a threshold, and wherein based on the feed forward signal and the threshold, the comparator generates the buck status signal at the output terminal; and
a buck control logic unit coupled to the output terminal of the comparator to receive the buck status signal, wherein based on the buck status signal, the buck control logic unit generates the buck control signal; wherein the threshold is related to the buck threshold; wherein the threshold is related to the buck threshold.

20. The switching mode power supply of claim 17, wherein the buck controller comprises:
a comparator having a first input terminal, a second input terminal and an output terminal, wherein the first input terminal is configured to receive the feed forward signal indicative of the input signal, the second input terminal is configured to receive a threshold, and wherein based on the feed forward signal and the threshold, the comparator generates the buck status signal at the output terminal; and wherein the threshold is related to the buck threshold;
a hysteretic comparator having a first input terminal, a second input terminal and an output terminal, wherein the first input terminal is configured to receive the feed forward signal indicative of the input signal, the second input terminal is configured to receive a reference voltage, and wherein based on the feed forward signal, the reference voltage and an inherent hysteresis of the hysteretic comparator, the hysteretic comparator generates a switching signal at the output terminal; and
a logic circuit having a first input terminal, a second input terminal, and an output terminal, wherein the first input terminal is coupled to the output terminal of the comparator to receive the buck status signal, the second input terminal is coupled to the output terminal of the hysteretic comparator to receive the switching signal, and wherein based on the buck status signal and the switching signal, the logic circuit generates the buck control signal at the output terminal.

* * * * *